United States Patent [19]

Sato et al.

[11] 4,443,483

[45] Apr. 17, 1984

[54] METHOD FOR INHIBITING NITROSAMINE FORMATION DURING COOKING OF MEAT

[75] Inventors: Kunito Sato, Scottsdale, Ariz.; Richard F. Theiler, Harrington Park, N.J.

[73] Assignee: Armour Food Company, Phoenix, Ariz.

[21] Appl. No.: 392,848

[22] Filed: Jun. 28, 1982

[51] Int. Cl.³ ............................ A23B 4/02; A23B 4/14
[52] U.S. Cl. .................................... 426/266; 426/281; 426/332; 426/652
[58] Field of Search ............... 426/265, 266, 281, 332, 426/641, 646, 652, 264; 252/400 R, 405, 407

[56] References Cited

U.S. PATENT DOCUMENTS

| | | | |
|---|---|---|---|
| 2,781,271 | 2/1957 | Wiesman et al. | 426/652 X |
| 3,156,569 | 11/1964 | Griffin et al. | 426/652 X |
| 3,186,853 | 6/1965 | Meusel | 426/646 X |
| 3,821,444 | 6/1974 | Sato et al. | 426/332 |
| 3,857,981 | 12/1974 | Sato et al. | 426/265 |
| 3,867,558 | 2/1975 | Sato et al. | 426/265 |
| 4,279,936 | 7/1981 | Jones et al. | 426/265 |
| 4,315,015 | 2/1982 | Theiler | 426/266 |

*Primary Examiner*—Arthur L. Corbin
*Attorney, Agent, or Firm*—Frank T. Barber; Richard G. Harrer; Bernard L. Howard

[57] ABSTRACT

A method for inhibiting the formation of nitrosamines during the cooking of a nitrite-cured meat, by introducing a gamma pyrone compound, optionally in combination with a reducing sugar or liquid smoke, into the meat prior to cooking.

15 Claims, No Drawings

METHOD FOR INHIBITING NITROSAMINE FORMATION DURING COOKING OF MEAT

BACKGROUND OF THE INVENTION

1. Field of the Invention

This invention relates to nitrite-curing processes for food. More particularly, this invention relates to the use of any of a group of compounds in a preparation process for bacon and similar nitrite-cured meat products, to thereby impart a resistance to the formation of nitrosamine compounds during the cooking process. The improvement can be practiced as part of the nitrite-curing process, or as a step preceding or following the nitrite-curing process.

2. Description of the Prior Art

In the past, sodium nitrite, and its precursor sodium nitrate, have been extensively used in metal curing processes. Use of sodium nitrite effectively controlled the growth of toxin-producing Clostridium botulinum bacteria. Sodium nitrite provided a reddish color for the preserved meat, and also produced a well-received "cured" flavor for the finished product.

Recently, sodium nitrite has been identified as a contributor to, or initiator of, reactions which produce various nitrosamine compounds. Based on tests with animals, the nitroso-compounds have been indicated as carcinogens.

The formation of nitrosamines in nitrite-cured meat products principally occurred during the high-temperature cooking of the meat. For example, uncooked, nitrite-cured bacon was virtually free of nitrosamines, but after frying, both the rasher and the cooked-out fat normally contained measurable levels of nitrosamine compounds. The prevalant nitrosamine compound formed by the bacon-frying process was N-nitrosopyrrolidine.

A need existed for a method of inhibiting the production and formation of nitrosamine compounds while cooking bacon.

SUMMARY OF THE INVENTION

In accord with one embodiment of this invention, it is an object to teach a method for inhibiting the production of nitrosamines during the cooking of a nitrite-cured meat product.

It is an object to provide a compound which will inhibit nitrosamine formation when a nitrite-cured meat product is cooked.

It is another object to teach an improved nitrite-curing process that produces a meat product which generates reduced levels of nitrosamines upon cooking, comprising the step of introducing a gamma pyrone into the meat.

It is a further object to teach a method of reducing the quantity of nitrosamines formed during the cooking of bacon, by treating the bacon with 3- and/or 5-hydroxy-gamma-pyrone prior to the cooking process.

It is an object to provide a nitrite-cured meat product that resists nitrosamine formation when cooked.

DESCRIPTION OF THE PREFERRED EMBODIMENTS

In accordance with one embodiment of this invention, an improvement in a nitrite-curing process for meat is disclosed, comprising the step of introducing into the meat a quantity of a gamma pyrone so that production of nitrosamines is inhibited during the subsequent cooking of the meat.

In accordance with another embodiment of this invention, an improved meat curing compound is disclosed, comprising: a nitrite source; and a gamma pyrone.

In accordance with a further embodiment of this invention, a nitrosamine-formation-resistant meat product is disclosed, comprising: meat; a nitrite source in the meat; and a gamma pyrone in the meat.

the foregoing and other objects, features and advantages of this invention will be apparent from the following, more particular description of the preferred embodiments of the invention.

THE SPECIFICATION

I have found that the introduction of a gamma pyrone compound into a nitrite-cured meat product inhibits the formation of nitrosamines when the meat product is subsequently cooked at high temperature. Use of a gamma pyrone compound in conjunction with other known inhibitors offers a cooperative reaction that further inhibits nitrosamine formation. The reduction in nitrosamine formation results in an improved table-ready product. The exact mechanism by which the specifically identified inhibitors block the nitrosamine formation is not clearly known, but the efficacy of the process is well-established by the following test results.

The essential component of the inhibitor compound is a member of the gamma-pyrone family. Successfully tested members of the family include kojic acid (5-hydroxy-2-hydroxymethyl-4-pyrone), maltol (3-hydroxy-2-methyl-4-pyrone) and ethyl maltol (3-hydroxy-2-ethyl-4-pyrone). In concept, the invention includes 3-hydroxy-gamma pyrones, 5-hydroxy-gamma pyrones, and derivatives of either compound.

The practice of the invention involves the introduction of the inhibitor into the meat. The inhibiting compound can be introduced into the meat by injection (together with or separate from the pickle solution), by dipping the meat into the inhibiting compound (together with or separate from the pickle solution), or by applying the same to the surface of sliced meat (either together with or separate from the curing pickle).

Kojic acid is an antibiotic substance produced by a variety of microorganisms. Maltol is commercially produced, and is used in gelatin desserts and ice cream as a flavoring or as an aroma enhancer. Ethyl maltol is also commercially produced, and is used as a sweet-smelling, fragrant flavoring.

The discovery of the nitrosamine inhibiting process grew out of a series of tests upon a model bacon system. The model bacon system utilized ground pork bellies to improve analytical precision by reducing the macroscopic variations otherwise present among the whole sides of bacon. For each test, a control batch was prepared. In the control batch, ground pork was mechanically mixed with a quantity of conventional nitrite cure pickle, equal to 10% of the weight of the meat. The conventional pickle included sodium chloride, sodium tripolyphosphate, sodium erythorbate monohydrate, sodium nitrite and "Veralock", a commercially available flavoring agent. For each of the tests, at least one specimen batch was prepared by adding a quantity of a specific inhibitor or combination of inhibitors to the pickle, in lieu of an equivalent quantity of water. The pickle for the specimen batches continued to be added to the meat at a 10% "pump" level.

The mixed pork-pickle combination was stuffed into cellulose sausage casings to form 3 to 4 pound "chubs". The chubs were smoked and heat processed to an internal temperature of 126 to 130 degrees F., in accord with conventional bacon-curing practice. The cured chubs were refrigerated overnight in a 38 degree F. cooler. Subsequently, the chubs were sliced into bacon-slice thickness pieces, nominally 3.5 mm. thick. The sliced chubs were vacuum packed and stored under 38 degree F. refrigeration for an additional day. The slices were then fried for 5 minutes per side at 340 degrees F. The fried slices were finely chopped, and tested for the presence of nitrosamines, specifically for the presence of N-nitrosopyrrolidine.

The nitrosamine quantification was performed according to the method described in D. H. Fine, et al, "A Rapid Method for the Determination of sub-part per Billion Amounts of N-nitroso Compounds in Foodstuffs", *Anal. Chim. Acta.* 78, 383 (1975). The testing method is further described in D. C. Harvery, et al, "Survey of Cured Meat Products for Volatile N-Nitrosamines; Comparison of Two Analytical Methods", *J. Assoc. of Anal. Chem.* 61, 1374 (1978).

The development of the invention involved two stages: first, it was surprisingly found as a result of two separate tests that gamma pyrone compounds could be added to the pickle solution to greatly inhibit the production of nitrosamines during the subsequent frying step. Second, it was found as a result of two additional tests that certain other agents, including a reducing sugar and/or a commercial "liquid smoke" preparation, could be added in conjunction with the gamma pyrone to further reduce the production of nitrosamines. Additionally, it was found in an adjunct test that the gamma pyrone compound could be separately applied to the sliced product, after the conventional curing process was otherwise complete, and still gain the benefit from the reduction in nitosamine production when the product was subsequently fried. The following examples are illustrative.

TEST 1

Four different pickle solutions were prepared as follows.

|  | Control | Kojic Acid | Maltol | Ethyl Maltol |
|---|---|---|---|---|
| Water | 81.76 | 81.26 | 81.26 | 81.26 |
| Sodium Chloride | 15.0 | 15.0 | 15.0 | 15.0 |
| Sodium Tripolyphosphate | 2.5 | 2.5 | 2.5 | 2.5 |
| Sodium Erythorbate Monohydrate | 0.6 | 0.6 | 0.6 | 0.6 |
| Sodium Nitrite | 0.12 | 0.12 | 0.12 | 0.12 |
| Veralock | 0.02 | 0.02 | 0.02 | 0.02 |
| Kojic Acid | — | 0.5 | — | — |
| Maltol | — | — | 0.5 | — |
| Ethyl Maltol | — | — | — | 0.5 |

Test 1 Results

| Treatment | N—Pyr ppb. | % Reduction in N—Pyr |
|---|---|---|
| Control | 13.5 ± 1.7 | — |
| 0.5% Kojic acid | 6.5 ± 0.6 | 52 |
| 0.5% Maltol | 7.9 ± 2.1 | 42 |
| 0.5% Ethyl maltol | 10.0 ± 1.1 | 26 |

The Test 1 results show that each of the tested gamma pyrone compounds is effective in inhibiting the formation of nitrosamines during the cooking of bacon.

TEST 2

Three different pickle solutions were prepared, as follows.

|  | Control | 0.10% Maltol | 0.25% Maltol |
|---|---|---|---|
| Water | 81.76 | 81.66 | 81.51 |
| Sodium Chloride | 15.0 | 15.0 | 15.0 |
| Sodium Tripolyphosphate | 2.5 | 2.5 | 2.5 |
| Sodium Erythorbate Monohydrate | 0.6 | 0.6 | 0.6 |
| Sodium Nitrite | 0.12 | 0.12 | 0.12 |
| Veralock | 0.02 | 0.02 | 0.02 |
| Maltol | — | 0.10 | 0.25 |

Test 2 Results

| Treatment | N—Pyr ppb. | % Reduction in N—Pyr |
|---|---|---|
| Control | 15.6 ± 2.2 | — |
| 0.10% Maltol | 12.7 ± 2.7 | 19 |
| 0.25% Maltol | 11.5 ± 3.3 | 26 |

The Test 2 results show that there is a correspondence between the level of maltol included in the model bacon, and the extent of nitrosamine-formation inhibition achieved as a result.

TEST 3

Four different pickle solutions were prepared, as follows.

|  | Control | 0.25% Maltol | 0.25% Glucose | Maltol and Glucose |
|---|---|---|---|---|
| Water | 81.76 | 81.51 | 81.51 | 81.26 |
| Sodium Chloride | 15.0 | 15.0 | 15.0 | 15.0 |
| Sodium Tripolyphosphate | 2.5 | 2.5 | 2.5 | 2.5 |
| Sodium Erythorbate Monohydrate | 0.6 | 0.6 | 0.6 | 0.6 |
| Sodium Nitrite | 0.12 | 0.12 | 0.12 | 0.12 |
| Veralock | 0.02 | 0.02 | 0.02 | 0.02 |
| Maltol | — | 0.25 | — | 0.25 |
| Glucose | — | — | 0.25 | 0.25 |

Test 3 Results

| Treatment | N—Pyr ppb. | % Reduction in N—Pyr |
|---|---|---|
| Control | 9.6 ± 1.1 | — |
| 0.25% Maltol | 7.5 ± 1.2 | 22 |
| 0.25% Glucose | 9.1 ± 2.1 | 5 |
| 0.25% Maltol + 0.25% Glucose | 6.1 ± 0.7 | 37 |

The Test 3 results show that both maltol and a reducing sugar, namely glucose, individually inhibit nitrosamine formation during bacon cooking, but additionally show that the combination of maltol and glucose offers an improvement in the achievable degree of nitrosamine-formation inhibition, which is not obtained by using either ingredient alone.

TEST 4A

Four different pickle solutions were prepared, as follows.

|  | Control | 0.20% Maltol | 0.15% Halosmoke | 0.20% Glucose |
|---|---|---|---|---|
| Water | 81.76 | 81.56 | 81.61 | 81.56 |
| Sodium Chloride | 15.0 | 15.0 | 15.0 | 15.0 |
| Sodium Tripolyphosphate | 2.5 | 2.5 | 2.5 | 2.5 |
| Sodium Erythorbate Monohydrate | 0.6 | 0.6 | 0.6 | 0.6 |
| Sodium Nitrite | 0.12 | 0.12 | 0.12 | 0.12 |
| Veralock | 0.02 | 0.02 | 0.02 | 0.02 |
| Maltol | — | 0.20 | — | — |
| Halosmoke | — | — | 0.15 | — |

TEST 4A-continued

Four different pickle solutions were prepared, as follows.

|  | Control | 0.20% Maltol | 0.15% Halosmoke | 0.20% Glucose |
|---|---|---|---|---|
| Glucose | — | — | — | 0.20 |

Test 4B

Three additional pickle solutions were prepared as follows.

|  | Maltol + Halosmoke | Maltol + Glucose | Maltol + Halosmoke ± Glucose |
|---|---|---|---|
| Water | 81.51 | 81.46 | 81.31 |
| Sodium Chloride | 15.0 | 15.0 | 15.0 |
| Sodium Tripolyphosphate | 2.5 | 2.5 | 2.5 |
| Sodium Erythorbate Monohydrate | 0.6 | 0.6 | 0.6 |
| Sodium Nitrite | 0.12 | 0.12 | 0.12 |
| Veralock | 0.02 | 0.02 | 0.02 |
| Maltol | 0.10 | 0.10 | 0.10 |
| Halosmoke | 0.15 | — | 0.15 |
| Glucose | — | 0.20 | 0.20 |

Test 4 Results

| Treatment | N—Pyr ppb. | % Reduction in N—Pyr |
|---|---|---|
| Control | 27.6 | — |
| 0.20% Maltol | 22.8 | 17.4 |
| 0.15% Halosmoke | 16.4 | 40.6 |
| 0.20% Glucose | 21.0 | 24.0 |
| 0.10% Maltol + 0.15% Halosmoke | 14.3 | 48.2 |
| 0.10% Maltol + 0.20% Glucose | 19.4 | 29.7 |
| 0.10% Maltol + 0.15% Halosmoke + 0.20% Glucose | 10.0 | 63.8 |

"Halosmoke" is a commercially available liquid smoke compound, sold by the Red Arrow Products Company under their designation "Arrow P50".

The results from Test 4 clearly show that maltol can be used in combination with Halosmoke or glucose to provide improved performance in the inhibition of the formation of nitrosamines. The results also show that all three compounds can be used in combination to offer even further improvement in the available degree of nitrosamine-formation-inhibition.

Thus the foregoing tests clearly show that 3-hydroxy-gamma pyrones and 5-hydroxy-gamma pyrones can be introduced into meat to provide an effective inhibition of the formation of nitrosamines during the subsequent cooking of a meat product. The tests further show that gamma pyrone compounds can be introduced in conjunction with glucose and/or a liquid smoke to even further inhibit the formation of nitrosamines during the bacon-cooking process.

While the invention has been particularly described with reference to preferred embodiments thereof, it will be understood by those skilled in the art that the foregoing and other changes in form and detail may be made therein without departing from the spirit and scope of the invention.

I claim:

1. In a nitrite-curing process for meat, the improvement comprising the step of introducing into said meat a gamma pyrone in combination with a reducing sugar in amounts sufficient to inhibit production of nitrosamines during subsequent cooking of said meat.

2. An improvement in accord with claim 1, wherein said gamma pyrone is selected from the group of 3-hydroxy-gamma-pyrones or the derivatives of 3-hydroxy-gamma-pyrones.

3. An improvement in accord with claim 1, wherein said gamma pyrone is selected from the group of 5-hydroxy-gamma-pyrones or the derivatives of 5-hydroxy-gamma-pyrones.

4. An improvement in accord with claim 1, wherein said gamma pyrone is maltol.

5. An improvement in accord with claim 1, wherein said reducing sugar is glucose.

6. An improvement in accord with claim 1, wherein liquid smoke is used in combination with said gamma pyrone and said reducing sugar, in an amount sufficient to further inhibit nitrosamine production when said meat is cooked.

7. An improvement in accord with claim 1, wherein said gamma pyrone is maltol in an amount at least about 0.10% by pickle weight, and said reducing sugar is glucose in an amount at least about 0.20% by pickle weight.

8. An improvement in accord with claim 1, wherein said step of introducing comprises the injection of a solution of a gamma pyrone and a reducing sugar into said meat.

9. An improvement in accord with claim 1, wherein said step of introducing comprises the dipping of said meat into a solution of a gamma pyrone and a reducing sugar.

10. An improvement in accord with claim 1, wherein said step of introducing includes the steps of:
   slicing said meat; and
   applying said gamma pyrone and said reducing sugar onto the surface of said meat.

11. In a nitrite-curing process for meat, the improvement comprising the step of introducing into said meat a quantity of a gamma pyrone in combination with liquid smoke in amounts sufficient to inhibit production of nitrosamines during subsequent cooking of said meat.

12. An improved meat-curing composition, comprising:
   a nitrite source; and
   a gamma pyrone in combination with a reducing sugar in amounts sufficient to inhibit nitrosamine production when said composition is introduced into meat and said meat is cooked.

13. An improvement in accord with claim 12, wherein liquid smoke is used in combination with said gamma pyrone and said reducing sugar in an amount sufficient to further inhibit nitrosamine production when said meat is cooked.

14. A nitrosame-formation-resistant meat product, comprising:
   meat;
   a nitrite source in said meat; and
   a gamma pyrone in combination with a reducing sugar in said meat in amounts sufficient to inhibit nitrosamine production when said meat is cooked.

15. An improvement in accord with claim 14, wherein liquid smoke is used in combination with said gamma pyrone and said reducing sugar in an amount sufficient to further inhibit nitrosamine production when said meat is cooked.

* * * * *